United States Patent
Wittmaak, Jr. et al.

(10) Patent No.: US 11,630,467 B2
(45) Date of Patent: Apr. 18, 2023

(54) VTOL AIRCRAFT HAVING MULTIFOCAL LANDING SENSORS

(71) Applicant: Textron Innovations Inc., Providence, RI (US)

(72) Inventors: John Robert Wittmaak, Jr., Newark, TX (US); Russell C. Peters, Fort Worth, TX (US); Aaron Hitchcock, Fort Worth, TX (US); William Ben Johns, Little Elm, TX (US); Levi Charles Hefner, Dallas, TX (US); Andrew Vincent Louis, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 286 days.

(21) Appl. No.: 17/133,229

(22) Filed: Dec. 23, 2020

(65) Prior Publication Data
US 2022/0197308 A1    Jun. 23, 2022

(51) Int. Cl.
*G05D 1/00* (2006.01)
*B64C 39/02* (2023.01)
(Continued)

(52) U.S. Cl.
CPC ....... *G05D 1/0669* (2013.01); *B64C 29/0091* (2013.01); *B64C 39/024* (2013.01);
(Continued)

(58) Field of Classification Search
CPC .. G05D 1/0669; G05D 1/0088; G05D 1/0676; G05D 1/00; B64C 29/0091;
(Continued)

(56) References Cited

U.S. PATENT DOCUMENTS

| 1,655,113 A | 1/1928 | Nikola |
| 2,601,090 A | 6/1952 | James |

(Continued)

FOREIGN PATENT DOCUMENTS

| CN | 105539833 A | 5/2016 |
| CN | 106054903 B | 11/2019 |

(Continued)

OTHER PUBLICATIONS

Air Launched Unmanned Disaster Relief Delivery Vehicle, 33rd Annual AHS Student Design Competition, University of Maryland, Undated but admitted prior art.

(Continued)

*Primary Examiner* — Yonel Beaulieu
(74) *Attorney, Agent, or Firm* — Lawrence Youst PLLC

(57) ABSTRACT

An aircraft includes an airframe with a thrust array attached thereto. The thrust array includes a plurality of propulsion assemblies that are independently controlled by a flight control system. A landing gear assembly is coupled to the airframe and includes a plurality of landing feet. An altitude sensor array includes a plurality of altitude sensors each of which is disposed within one of the landing feet such that when the aircraft is in the VTOL orientation, the altitude sensor array is configured to obtain multifocal altitude data relative to a landing surface. The flight control system is configured to generate a three-dimensional terrain map of the surface based upon the multifocal altitude data.

18 Claims, 13 Drawing Sheets

(51) Int. Cl.
*G01S 13/00* (2006.01)
*B64C 29/00* (2006.01)
*G06V 20/13* (2022.01)
*G05D 1/06* (2006.01)
*G01S 13/91* (2006.01)
*B64U 101/30* (2023.01)

(52) U.S. Cl.
CPC .......... *G01S 13/913* (2013.01); *G05D 1/0088* (2013.01); *G06V 20/13* (2022.01); *B64U 2101/30* (2023.01)

(58) Field of Classification Search
CPC ............ B64C 39/024; B64C 2201/123; B64C 2201/027; B64C 2201/042; B64C 2201/104; B64C 2201/108; B64C 2201/128; B64C 2201/18; B64C 29/02; B64C 39/02; G01S 13/913; G01S 13/882; G01S 13/00; G06V 20/13; G06K 9/6228
See application file for complete search history.

(56) References Cited

U.S. PATENT DOCUMENTS

| | | | |
|---|---|---|---|
| 2,655,997 A | 10/1953 | Peterson | |
| 2,688,843 A | 9/1954 | Pitt | |
| 3,002,712 A | 10/1961 | Sterling | |
| 3,081,964 A | 3/1963 | Quenzler | |
| 3,181,810 A | 5/1965 | Olson | |
| 3,259,343 A | 7/1966 | Roppel | |
| 3,289,980 A | 12/1966 | Gardner | |
| 3,350,035 A | 10/1967 | Schlieben | |
| 3,592,412 A | 7/1971 | Glatfelter | |
| 3,618,875 A | 11/1971 | Kappus | |
| 3,783,618 A | 1/1974 | Kawamura | |
| 3,916,588 A | 11/1975 | Magill | |
| 4,243,358 A | 1/1981 | Carlock et al. | |
| 4,458,864 A | 7/1984 | Colombo et al. | |
| 4,571,157 A | 2/1986 | Eickmann | |
| 4,596,368 A | 6/1986 | Schmittle | |
| 4,613,098 A | 9/1986 | Eickmann | |
| 4,741,672 A | 5/1988 | Breuner | |
| 4,771,967 A | 9/1988 | Geldbaugh | |
| 4,913,377 A | 4/1990 | Eickmann | |
| 4,925,131 A | 5/1990 | Eickmann | |
| 5,131,605 A | 7/1992 | Kress | |
| 5,188,512 A | 2/1993 | Thornton | |
| 5,592,894 A | 1/1997 | Johnson | |
| 5,842,667 A | 12/1998 | Jones | |
| 6,086,015 A | 7/2000 | MacCready | |
| 6,170,778 B1 | 1/2001 | Cycon et al. | |
| 6,260,793 B1 | 7/2001 | Balayn et al. | |
| 6,270,038 B1 | 8/2001 | Cycon et al. | |
| 6,402,088 B1 | 6/2002 | Syrovy et al. | |
| 6,655,631 B2 | 12/2003 | Austen-Brown | |
| 6,845,939 B1 | 1/2005 | Baldwin | |
| 6,886,776 B2 | 5/2005 | Wagner et al. | |
| 6,892,980 B2 | 5/2005 | Kawai | |
| 7,059,562 B2 | 6/2006 | Baldwin | |
| 7,150,429 B2 | 12/2006 | Kusic | |
| 7,210,654 B1 | 5/2007 | Cox et al. | |
| 7,465,236 B2 | 12/2008 | Wagels | |
| 7,472,863 B2 | 1/2009 | Pak | |
| 7,555,893 B2 | 7/2009 | Okai et al. | |
| 7,984,684 B2 | 7/2011 | Hinderks | |
| 8,152,096 B2 | 4/2012 | Smith | |
| 8,393,564 B2 | 3/2013 | Kroo | |
| 8,427,360 B2 | 4/2013 | Longstaff | |
| 8,505,846 B1 | 8/2013 | Sanders | |
| 8,602,348 B2 | 12/2013 | Bryant | |
| 8,646,720 B2 | 2/2014 | Shaw | |
| 8,733,690 B2 | 5/2014 | Bevirt et al. | |
| 8,800,912 B2 | 8/2014 | Oliver | |
| 8,820,672 B2 | 9/2014 | Erben et al. | |
| 8,833,692 B2 | 9/2014 | Yoeli | |
| 8,909,391 B1 | 12/2014 | Peeters et al. | |
| 8,948,935 B1 | 2/2015 | Peeters et al. | |
| 9,022,312 B2 | 5/2015 | Kosheleff | |
| 9,045,226 B2 | 6/2015 | Piasecki et al. | |
| 9,087,451 B1 | 7/2015 | Jarrell | |
| 9,108,744 B2 | 8/2015 | Takeuchi | |
| 9,109,575 B2 | 8/2015 | Weddendorf et al. | |
| 9,120,560 B1 | 9/2015 | Armer et al. | |
| 9,127,908 B2 | 9/2015 | Miralles | |
| 9,162,753 B1 | 10/2015 | Panto et al. | |
| 9,187,174 B2 | 11/2015 | Shaw | |
| 9,193,460 B2 | 11/2015 | Laudrain | |
| 9,221,538 B2 | 12/2015 | Takahashi et al. | |
| 9,242,714 B2 | 1/2016 | Wang et al. | |
| 9,254,916 B2 | 2/2016 | Yang | |
| 9,284,049 B1 | 3/2016 | Wang et al. | |
| 9,321,530 B2 | 4/2016 | Wang et al. | |
| 9,376,208 B1 | 6/2016 | Gentry | |
| 9,388,794 B2 | 7/2016 | Weddendorf et al. | |
| 9,403,593 B2 | 8/2016 | Downey et al. | |
| 9,440,736 B2 | 9/2016 | Bitar | |
| 9,463,875 B2 | 10/2016 | Abuelsaad et al. | |
| 9,493,225 B2 | 11/2016 | Wang et al. | |
| 9,610,817 B1 | 4/2017 | Piasecki et al. | |
| 9,643,720 B2 | 5/2017 | Hesselbarth | |
| 9,694,908 B2 | 7/2017 | Razroev | |
| 9,694,911 B2 | 7/2017 | Bevirt et al. | |
| 9,714,087 B2 | 7/2017 | Matsuda | |
| 9,798,322 B2 | 10/2017 | Bachrach et al. | |
| 9,800,091 B2 | 10/2017 | Nugent, Jr. et al. | |
| 9,821,909 B2 | 11/2017 | Moshe | |
| 9,963,228 B2 | 5/2018 | McCullough et al. | |
| 9,994,313 B2 | 6/2018 | Claridge et al. | |
| 10,011,351 B2 | 7/2018 | McCullough et al. | |
| 10,124,890 B2 | 11/2018 | Sada-Salinas et al. | |
| 10,183,746 B2 | 1/2019 | McCullough et al. | |
| 10,214,285 B2 | 2/2019 | McCullough et al. | |
| 10,220,944 B2 | 3/2019 | McCullough et al. | |
| 10,227,133 B2 | 3/2019 | McCullough et al. | |
| 10,232,950 B2 | 3/2019 | McCullough et al. | |
| 10,266,249 B2 | 4/2019 | Shue | |
| 10,301,016 B1 | 5/2019 | Bondarev et al. | |
| 10,322,799 B2 | 6/2019 | McCullough et al. | |
| 10,964,221 B2 * | 3/2021 | Vana | G01S 17/89 |
| 2002/0100834 A1 | 8/2002 | Baldwin | |
| 2002/0100835 A1 | 8/2002 | Kusic | |
| 2003/0062443 A1 | 4/2003 | Wagner et al. | |
| 2004/0245374 A1 | 12/2004 | Morgan | |
| 2006/0091258 A1 | 5/2006 | Chiu et al. | |
| 2006/0266881 A1 | 11/2006 | Hughey | |
| 2007/0212224 A1 | 9/2007 | Podgurski | |
| 2007/0221780 A1 | 9/2007 | Builta | |
| 2008/0125920 A1 | 5/2008 | Miles et al. | |
| 2009/0008499 A1 | 1/2009 | Shaw | |
| 2010/0147993 A1 | 6/2010 | Annati et al. | |
| 2010/0193644 A1 | 8/2010 | Karem | |
| 2010/0295321 A1 | 11/2010 | Bevirt | |
| 2011/0001001 A1 | 1/2011 | Bryant | |
| 2011/0042508 A1 | 2/2011 | Bevirt | |
| 2011/0042509 A1 | 2/2011 | Bevirt et al. | |
| 2011/0057453 A1 | 3/2011 | Roberts | |
| 2011/0121570 A1 | 5/2011 | Bevirt et al. | |
| 2011/0315806 A1 | 12/2011 | Piasecki et al. | |
| 2012/0209456 A1 | 8/2012 | Harmon et al. | |
| 2012/0234968 A1 | 9/2012 | Smith | |
| 2013/0020429 A1 | 1/2013 | Kroo | |
| 2013/0175404 A1 | 7/2013 | Shefer | |
| 2013/0341458 A1 | 12/2013 | Sutton et al. | |
| 2014/0018979 A1 | 1/2014 | Goossen et al. | |
| 2014/0097290 A1 | 4/2014 | Leng | |
| 2014/0339372 A1 | 11/2014 | Dekel et al. | |
| 2015/0012154 A1 | 1/2015 | Senkel et al. | |
| 2015/0014475 A1 | 1/2015 | Taylor et al. | |
| 2015/0136897 A1 | 5/2015 | Seibel et al. | |
| 2015/0284079 A1 | 10/2015 | Matsuda | |
| 2015/0285165 A1 | 10/2015 | Steinwandel et al. | |
| 2016/0068265 A1 | 3/2016 | Hoareau et al. | |
| 2016/0180717 A1 | 6/2016 | Ubhi et al. | |
| 2016/0214712 A1 | 7/2016 | Fisher et al. | |

(56) References Cited

U.S. PATENT DOCUMENTS

| | | |
|---|---|---|
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0072755 A1* | 3/2017 | Zhou ................. B64C 29/0033 |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0263516 A1 | 8/2019 | McCullough et al. |
| 2019/0389573 A1 | 12/2019 | Kahou et al. |
| 2020/0023964 A1* | 1/2020 | Valente ................. G05D 1/102 |
| 2022/0250740 A1* | 8/2022 | Lee ....................... B64C 25/001 |

FOREIGN PATENT DOCUMENTS

| | | | |
|---|---|---|---|
| EP | 3002214 A1 * | 4/2016 | ............. B64C 25/34 |
| EP | 3633482 A1 * | 4/2020 | ............. B25J 15/00 |
| EP | 3653500 A1 * | 5/2020 | ............ B25J 9/1682 |
| FR | 2977865 A3 | 1/2013 | |
| GB | 587388 A | 4/1947 | |
| GB | 618475 A | 2/1949 | |
| GB | 654089 A | 6/1951 | |
| GB | 2581833 A * | 9/2020 | ............... B60V 3/08 |
| GB | 2586055 A * | 2/2021 | ............ B60T 13/662 |
| JP | 6395866 B2 | 9/2018 | |
| WO | 2001074659 A1 | 10/2001 | |
| WO | 2005039973 A2 | 5/2005 | |
| WO | 2014067563 A1 | 5/2014 | |

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.
Wolfe, Frank; Bell Moving to Scale Up Antonymous Delivery Drones for US Military; Rotor & Wing International; Sep. 27, 2018.

* cited by examiner

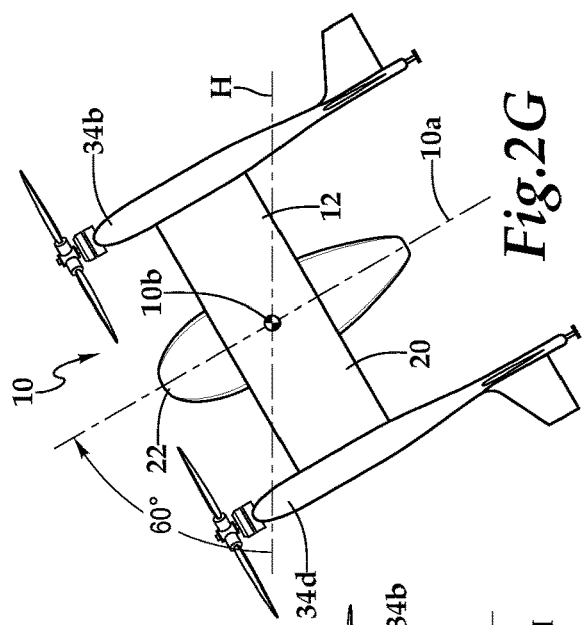
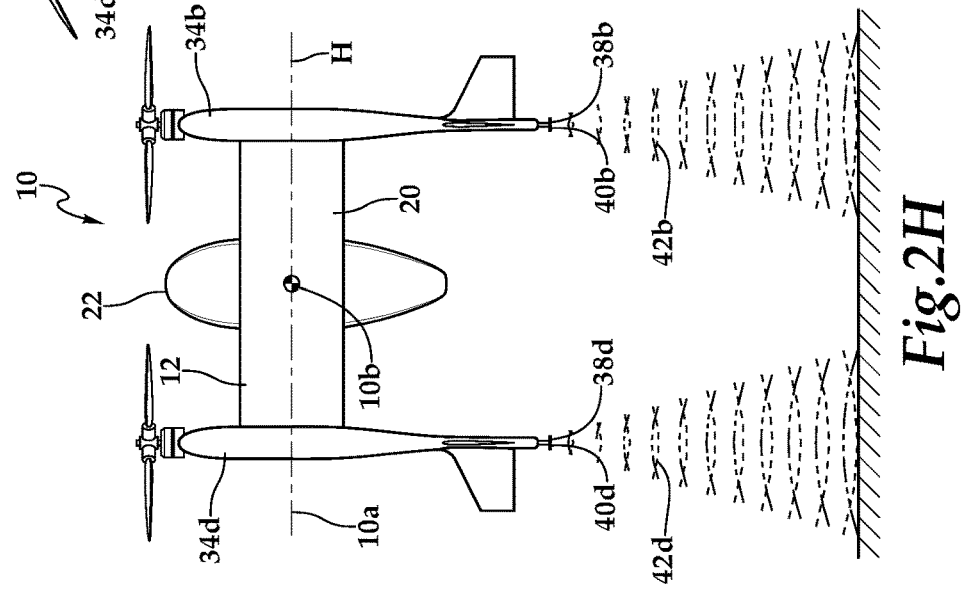
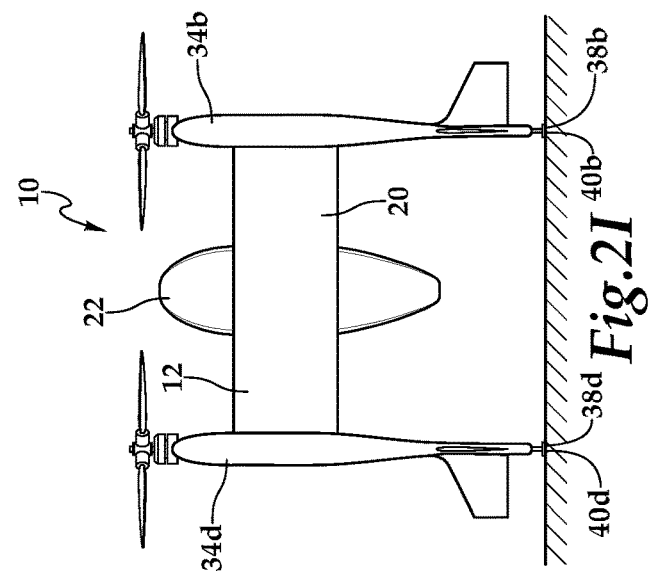

VTOL AIRCRAFT HAVING MULTIFOCAL LANDING SENSORS

TECHNICAL FIELD OF THE DISCLOSURE

The present disclosure relates, in general, to aircraft configured to convert between thrust-borne lift in a VTOL orientation and wing-borne lift in a biplane orientation and, in particular, to aircraft having an altitude sensor array configured to obtain multifocal altitude data for generating a three-dimensional terrain map of a landing site.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off and landing vertically. Rotorcraft such as helicopters, tiltrotors, tiltwings, quadcopters and other multicopters are examples of VTOL aircraft. Each of these rotorcraft utilizes one or more rotors to provide lift and thrust to the aircraft. The rotors not only enable vertical takeoff and landing, but may also enable hover, forward flight, backward flight and lateral flight. These attributes make VTOL aircraft highly versatile for use in congested, isolated or remote areas. It has been found, however, that identifying a suitable landing site remains a concern, particularly for autonomous VTOL aircraft which may sometimes be referred to as unmanned aerial vehicles (UAVs), unmanned aerial systems (UASs) or drones. For example, if an autonomous VTOL aircraft lands on a surface having an excessive slope, this can create a tip-over risk for the aircraft while it is on the ground. Accordingly, a need has arisen for an autonomous VTOL aircraft capable of identifying a suitable landing site during flight such that the aircraft has a stable orientation upon landing.

SUMMARY

In a first aspect, the present disclosure is directed to an aircraft having a VTOL orientation. The aircraft includes an airframe having a thrust array attached thereto that includes a plurality of propulsion assemblies. A flight control system is coupled to the airframe and is operable to independently control each of the propulsion assemblies. A landing gear assembly is coupled to the airframe. The landing gear assembly includes a plurality of landing feet. An altitude sensor array includes a plurality of altitude sensors each of which is disposed within one of the landing feet such that when the aircraft is in the VTOL orientation, the altitude sensor array is configured to obtain multifocal altitude data relative to a surface. The flight control system is configured to generate a three-dimensional terrain map of the surface based upon the multifocal altitude data.

In some embodiments, the altitude sensors may be radar altimeters configured to reflect radio waves off the surface. In certain embodiments, the altitude sensor array may include three altitude sensors, four altitude sensors or more. In some embodiments, each of the altitude sensors may be disposed proximate a distal end of the respective one of the landing feet. In certain embodiments, the flight control system may be configured to determine whether one or more of the landing feet are in contact with the surface based upon the multifocal altitude data. In some embodiments, the flight control system may be configured to identify a suitable landing site based upon the three-dimensional terrain map.

In certain embodiments, the flight control system may be configured to autonomously orient the aircraft in a preferred landing orientation relative to the surface based upon the three-dimensional terrain map. In some embodiments, the flight control system may be configured to autonomously orient the aircraft in a preferred landing orientation relative to a slope of the surface based upon the three-dimensional terrain map. In certain embodiments, the flight control system may be configured to autonomously orient a lateral axis of the aircraft to be substantially parallel to a slope of the surface prior to the aircraft making a four point landing on the surface. In some embodiments, the flight control system may be configured to autonomously maintain a level flight attitude prior to the aircraft making a two point by two point landing on a portion of the surface having a slope.

In certain embodiments, the airframe may include first and second wings with first and second pylons extending therebetween. In such embodiments, the thrust array may be a two-dimensional distributed thrust array in which the plurality of propulsion assemblies includes at least two propulsion assemblies coupled to the first wing and at least two propulsion assemblies coupled to the second wing. In some embodiments, the propulsion assemblies may be thrust vectoring propulsion assemblies.

In a second aspect, the present disclosure is directed to a method of operating an aircraft that includes locating the aircraft in a VTOL orientation over a surface, the aircraft including an airframe, a plurality of propulsion assemblies coupled to the airframe, a landing gear assembly coupled to the airframe and including a plurality of landing feet each having an altitude sensor disposed therein and a flight control system in communication with the altitude sensors and operable to control the propulsion assemblies. The method also includes obtaining multifocal altitude data from the altitude sensors and generating a three-dimensional terrain map of the surface with the flight control system based upon the multifocal altitude data.

The method may include determining whether one or more of the landing feet are in contact with the surface based upon the multifocal altitude data; identifying a suitable landing site based upon the three-dimensional terrain map; autonomously orienting the aircraft in a preferred landing orientation relative to the surface based upon the three-dimensional terrain map; autonomously orienting the aircraft in a preferred landing orientation relative to a slope of the surface based upon the three-dimensional terrain map; autonomously orienting a lateral axis of the aircraft to be substantially parallel to a slope of the surface prior to making a four point landing on the surface and/or autonomously maintaining a substantially level flight attitude prior to making a two point by two point landing on a portion of the surface having a slope.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2I are schematic illustrations of an aircraft having multifocal landing sensors in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
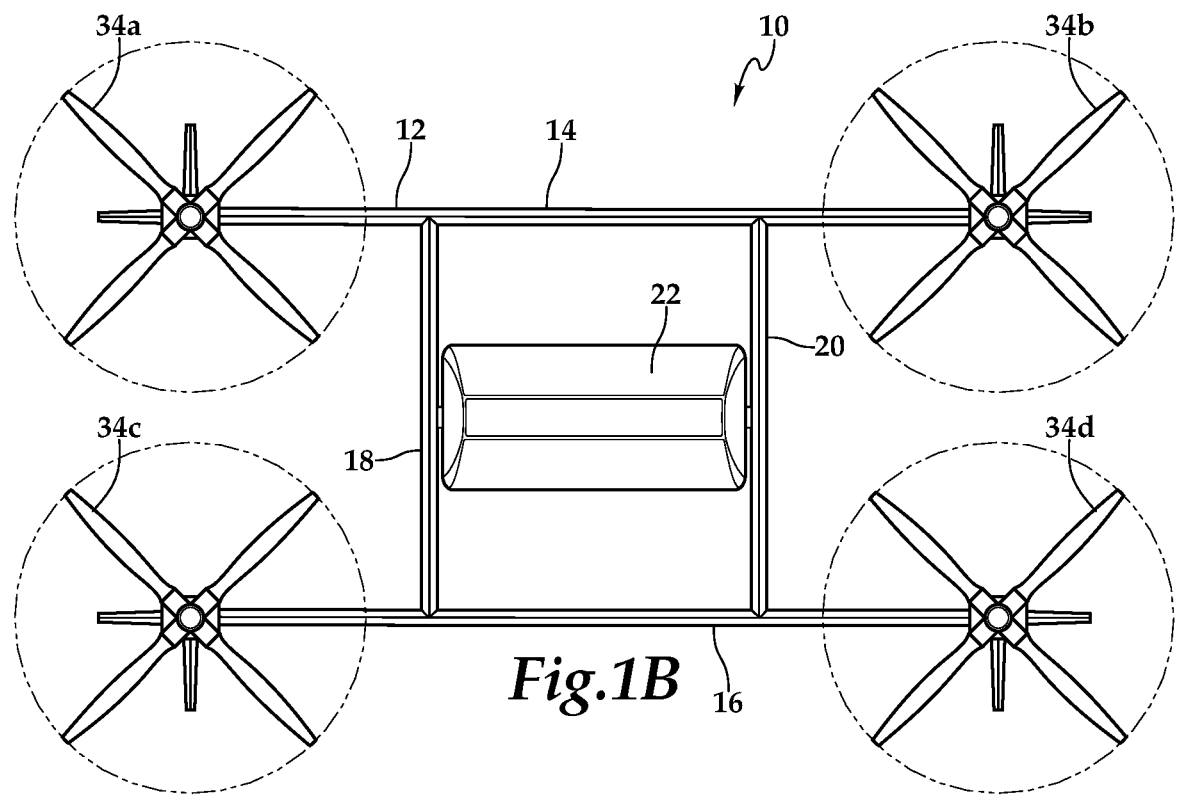
FIGS. 1A-1F are schematic illustrations of an aircraft having multifocal landing sensors that is operable to convert between thrust-borne lift in a VTOL orientation and wing-borne lift in a biplane orientation in accordance with embodiments of the present disclosure.
Figure 1A:
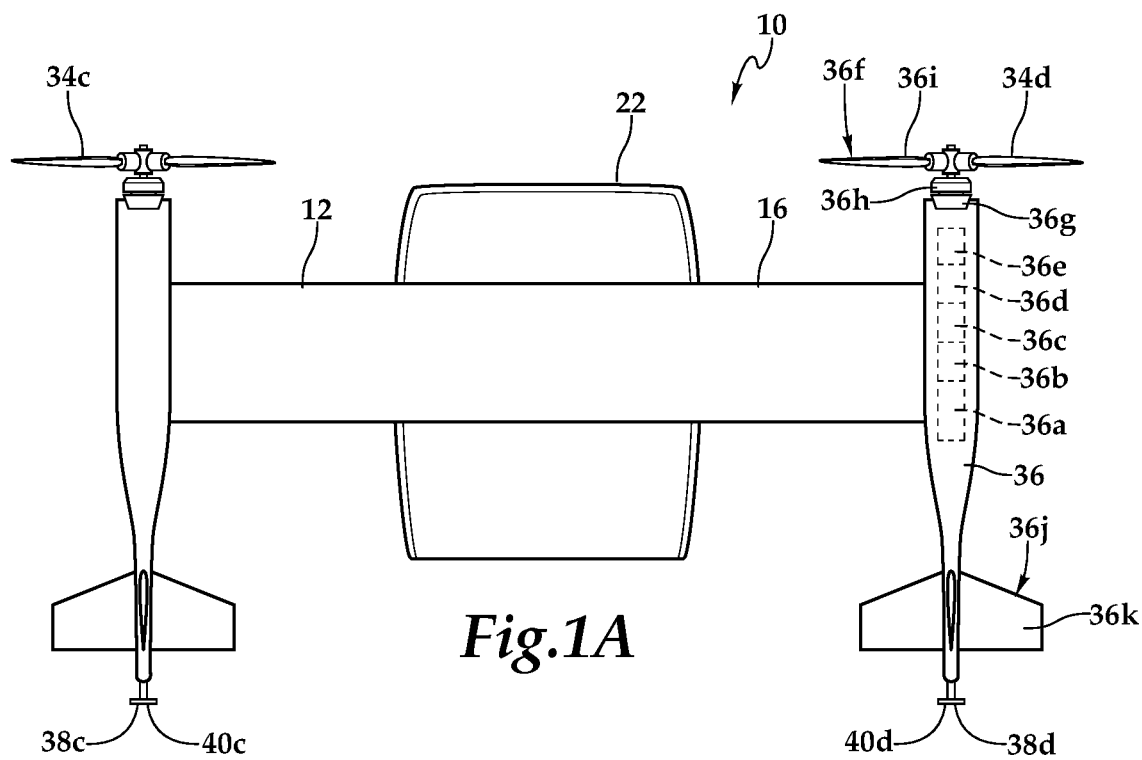
Figure 1D:
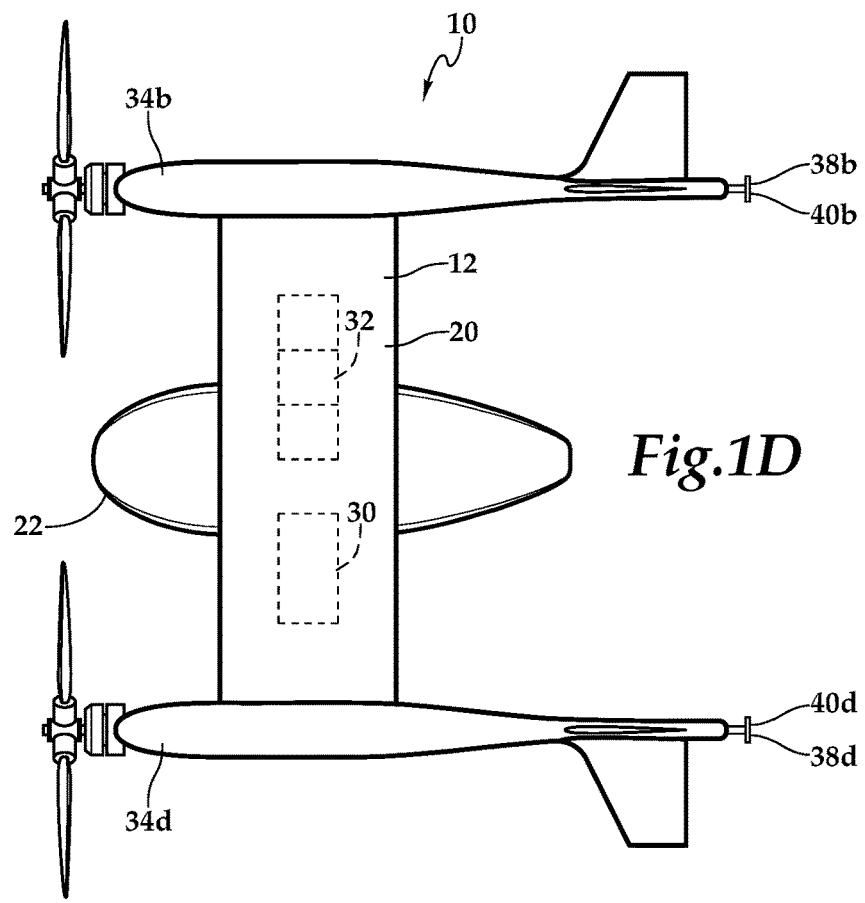
Figure 1C:
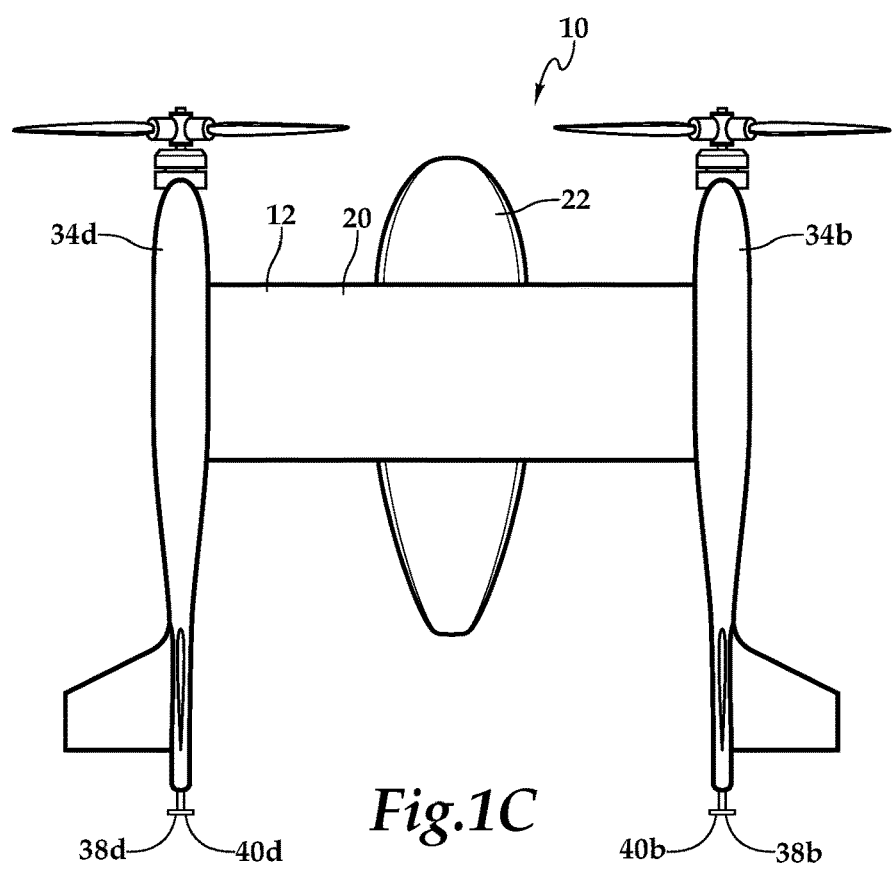
Figure 1F:
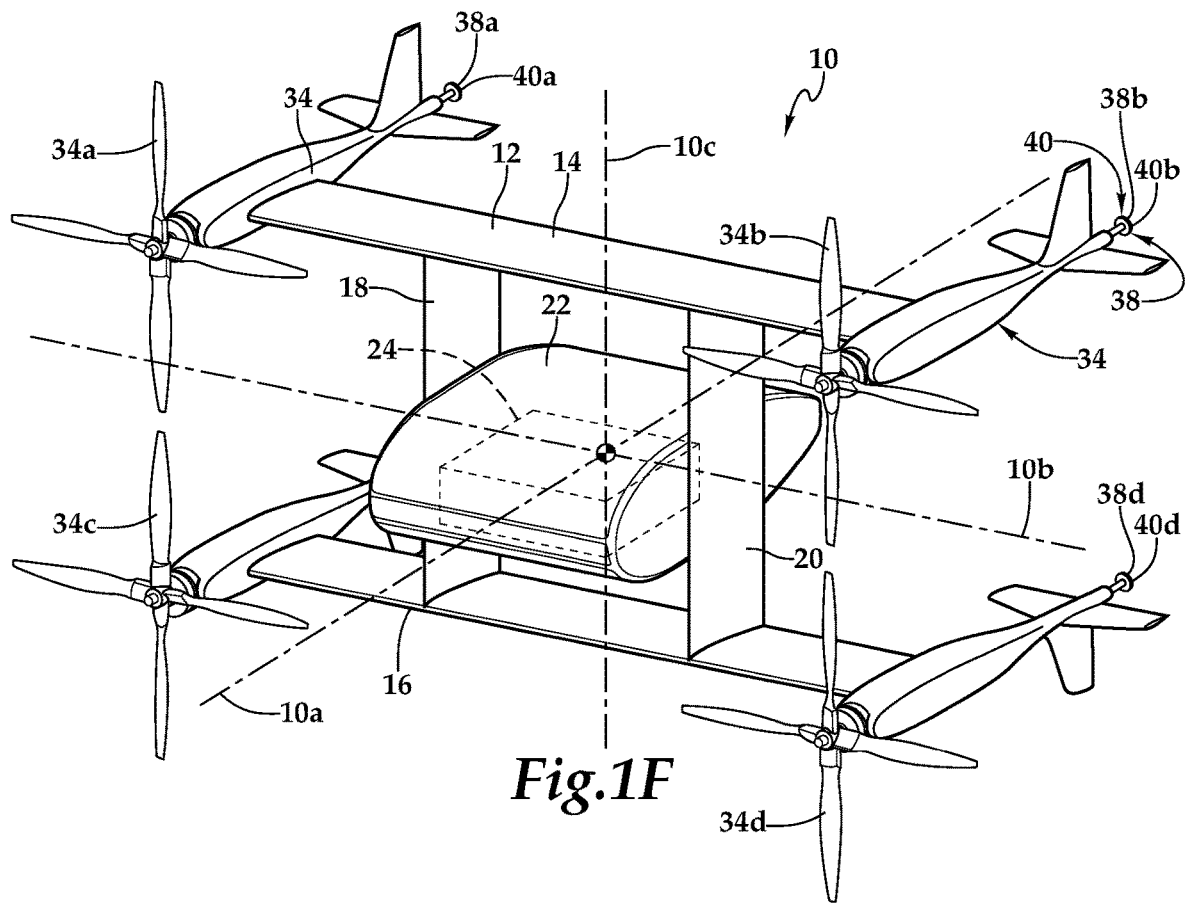
Figure 1E:
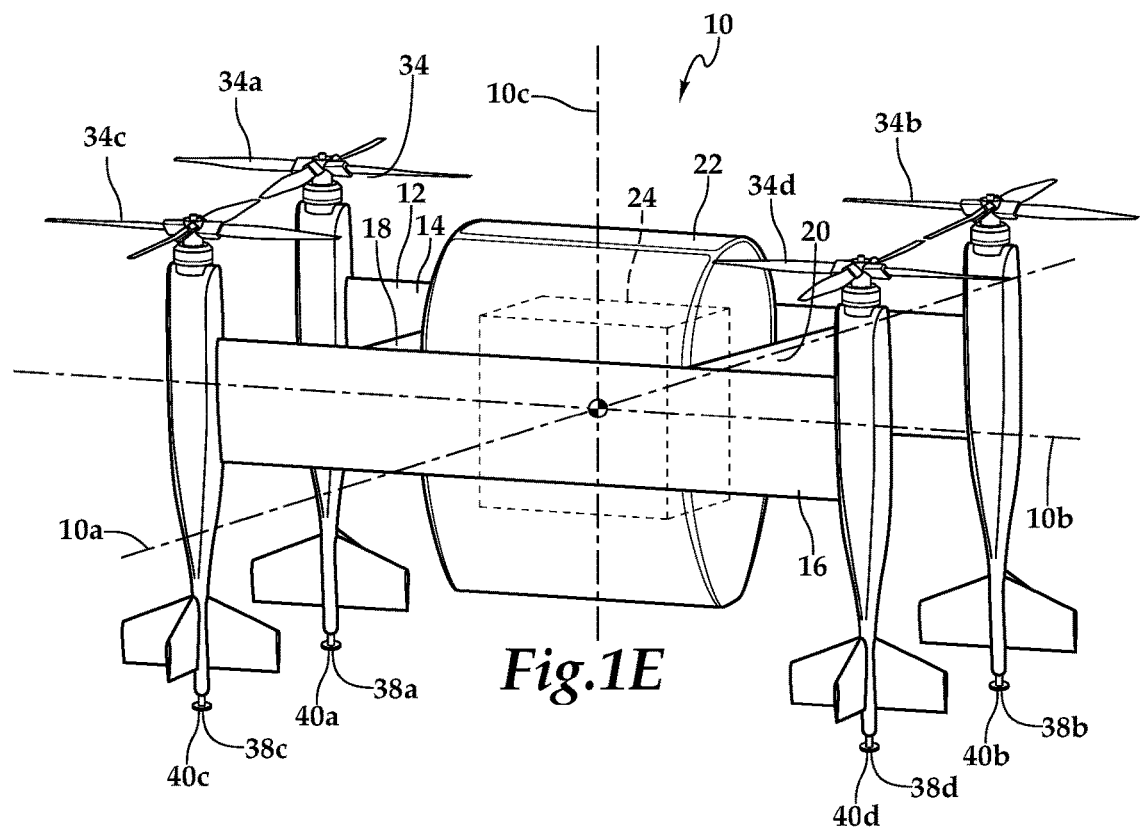

Referring to FIGS. 1A-1E in the drawings, various views of an aircraft 10 having multifocal landing sensors that is operable to transition between thrust-borne lift in a VTOL orientation and wing-borne lift in a biplane orientation are depicted. FIGS. 1A, 1C and 1E depict aircraft 10 in the VTOL orientation wherein the propulsion assemblies provide thrust-borne lift. FIGS. 1B, 1D and 1F depict aircraft 10 in the biplane orientation wherein the propulsion assemblies provide forward thrust with the forward airspeed of aircraft 10 providing wing-borne lift enabling aircraft 10 to have a high speed and/or high endurance forward flight mode. As best seen in FIGS. 1E-1F, aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude. In the illustrated embodiment, the length of aircraft 10 in the direction of lateral axis 10b is greater than the width of aircraft 10 in the direction of longitudinal axis 10a in the VTOL orientation of aircraft 10, as depicted in FIG. 1E. Both the magnitudes of the length and the width of aircraft 10 as well as the difference between the length and the width of aircraft 10 are important relative to the landing stability of aircraft 10 as well as the tip-over stability of aircraft 10 when aircraft 10 is positioned on a surface, such as the ground, in a tailsitter orientation.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. As best seen in FIG. 1B, in the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other.

Aircraft 10 includes a cargo pod 22 that is coupled between pylons 18, 20. Cargo pod 22 may be fixably or removably coupled to pylons 18, 20. In addition, in the coupled position, cargo pod 22 may be fixed, shiftable or rotatable relative to pylons 18, 20. Cargo pod 22 has an aerodynamic shape configured to minimize drag during high speed forward flight. Cargo pod 22 is preferably formed from high strength and lightweight materials such as fiberglass, carbon, plastic, metal or other suitable material or combination of materials. Cargo pod 22 has an interior region that may receive a payload 24 therein such as one or more packages. Aircraft 10 may autonomously transport and deliver payload 24 to a desired location in which case, aircraft 10 may be referred to as an unmanned aerial vehicle (UAV), an unmanned aerial system (UAS) or a drone.

One or more of cargo pod 22, wings 14, 16 and/or pylons 18, 20 may contain flight control systems, energy sources, communication lines and other desired systems. For example, as best seen in FIG. 1D, pylon 20 houses the flight control system 30 of aircraft 10. Flight control system 30 is preferably a redundant digital flight control system including multiple independent flight control computers. For example, the use of a triply redundant flight control system 30 improves the overall safety and reliability of aircraft 10 in the event of a failure in flight control system 30. Flight control system 30 preferably includes non-transitory computer readable storage media including a set of computer instructions executable by one or more processors for controlling the operation of aircraft 10. Flight control system 30 may be implemented on one or more general-purpose computers, special purpose computers or other machines with memory and processing capability. For example, flight control system 30 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 30 may be a microprocessor-based system operable to execute program code in the form of machine-executable instructions. In addition, flight control system 30 may be selectively connectable to other computer systems via a proprietary encrypted network, a public encrypted network, the Internet or other suitable communication network that may include both wired and wireless connections.

One or more of cargo pod 22, wings 14, 16 and/or pylons 18, 20 may contain one or more electrical power sources depicted as a plurality of batteries 32 in pylon 20, as best seen in FIG. 1D. Batteries 32 supply electrical power to flight control system 30, the distributed thrust array of aircraft 10 and other power consumers of aircraft 10 such that aircraft 10 may be referred to as an electric vertical takeoff and landing (eVTOL) aircraft. In other embodiments, aircraft 10 may have a hybrid power system that includes one or more internal combustion engines and an electric generator. Preferably, the electric generator is used to charge batteries 32. In other embodiments, the electric generator may provide power directly to a power management system and/or the power consumers of aircraft 10. In still other embodiments, aircraft 10 may use fuel cells as the electrical power source.

Cargo pod 22, wings 14, 16 and/or pylons 18, 20 also contain a wired and/or wireless communication network that enables flight control system 30 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 34a, 34b, 34c, 34d and collectively referred to as propulsion assemblies 34. In the illustrated embodiment, propulsion assemblies 34a, 34b are coupled at the wingtips of wing 14 and propulsion assemblies 34c, 34d are coupled at the wingtips of wing 16. By positioning propulsion assemblies 34a, 34b, 34c, 34d at the wingtip of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 34 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 34 relative to other propulsion assemblies 34.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 34 in a wingtip mounted configuration, the distributed thrust array of aircraft 10 could have propulsion assemblies coupled to the wings and/or pylons in other configurations such as mid-span configurations. Further, even though the illustrated embodiment depicts propulsion assemblies 34 in a mid-wing configuration, the distributed thrust array of aircraft 10 could have propulsion assemblies coupled to the wings in a low wing configuration, a high wing configuration or any combination or permutation thereof. In the illustrated embodiment, propulsion assemblies 34 are variable speed propulsion assemblies having fixed pitch rotor blades and thrust vectoring capability. Depending upon the implementation, propulsion assemblies 34 may have longitudinal thrust vectoring capability, lateral thrust vectoring capability or omnidirectional thrust vectoring capability. In other embodiments, propulsion assemblies 34 may operate as single speed propulsion assemblies, may have variable pitch rotor blades and/or may be non-thrust vectoring propulsion assemblies.

Propulsion assemblies 34 may be independently attachable to and detachable from airframe 12 and may be standardized and/or interchangeable units and preferably line replaceable units (LRUs) providing easy installation and removal from airframe 12. The use of line replaceable propulsion units is beneficial in maintenance situations if a fault is discovered with one of the propulsion assemblies. In this case, the faulty propulsion assembly 34 can be decoupled from airframe 12 by simple operations and another propulsion assembly 34 can then be attached to airframe 12. In other embodiments, propulsion assemblies 34 may be permanently coupled to wings 14, 16.

Referring to FIG. 1A, component parts of propulsion assembly 34d will now be described. It is noted that propulsion assembly 34d is representative of each propulsion assembly 34 therefore, for sake of efficiency, certain features have been disclosed only with reference to propulsion assembly 34d. One having ordinary skill in the art, however, will fully appreciate an understanding of each propulsion assembly 34 based upon the disclosure herein of propulsion assembly 34d. In the illustrated embodiment, propulsion assembly 34d includes a nacelle 36 that houses components including a battery 36a, an electronic speed controller 36b, one or more actuators 36c, an electronics node 34d, one or more sensors 36e and other desired electronic equipment. Nacelle 36 also supports a propulsion system 36f including a gimbal 36g, a variable speed electric motor 36h and a rotor assembly 36i. Extending from a lower end of nacelle 36 is a tail assembly 36j that includes one or more aerosurfaces 36k. In the illustrated embodiment, aerosurfaces 34k include stationary horizontal and vertical stabilizers. In other embodiments, aerosurfaces 34k may be active aerosurfaces that serve as elevators to control the pitch or angle of attack of wings 14, 16 and/or ailerons to control the roll or bank of aircraft 10 in the biplane orientation of aircraft 10. Aerosurfaces 34 also serve to enhance hover stability in the VTOL orientation of aircraft 10.

Flight control system 30 communicates via a wired communications network within airframe 12 with electronics nodes 36d of propulsion assemblies 34. Flight control system 30 receives sensor data from sensors 36e and sends flight command information to the electronics nodes 36d such that each propulsion assembly 34 may be individually and independently controlled and operated. For example, flight control system 30 is operable to individually and independently control the speed and the thrust vector of each propulsion system 36f. Flight control system 30 may autonomously control some or all aspects of flight operation for aircraft 10. Flight control system 30 is also operable to communicate with remote systems, such as a ground station via a wireless communications protocol. The remote system may be operable to receive flight data from and provide commands to flight control system 30 to enable remote flight control over some or all aspects of flight operation for aircraft 10.

Aircraft 10 has a landing gear assembly 38 that includes a plurality of landing feet depicted as landing foot 38a coupled to a lower or aft end of propulsion assembly 34a, landing foot 38b coupled to a lower or aft end of propulsion assembly 34b, landing foot 38c coupled to a lower or aft end of propulsion assembly 34c and landing foot 38d coupled to a lower or aft end of propulsion assembly 34d. By positioning landing feet 38a, 38b, 38c, 38d at the lower end of wingtip mounted propulsion assemblies 34, landing feet 38a, 38b, 38c, 38d are positioned at the maximum outboard distance from the center of gravity of aircraft 10 located, for example, at the intersection of axes 10a, 10b, 10c, which provides for maximum landing stability and tip-over stability for aircraft 10. To enhance the landing stability and tip-over stability of aircraft 10, however, aircraft 10 employs multifocal landing sensors depicted as plurality of altitude sensors 40a, 40b, 40c, 40d that are respectively disposed within landing feet 38a, 38b, 38c, 38d and may be collectively referred to as altitude sensor array 40. In the illustrated embodiment, altitude sensors 40a, 40b, 40c, 40d are disposed in the distal ends of landing feet 38a, 38b, 38c, 38d such that when aircraft 10 is in the VTOL orientation, altitude sensor array 40 is configured to obtain multifocal altitude data relative to the ground or other surface below aircraft 10. Flight control system 30 receives this multifocal altitude data from altitude sensors 40a, 40b, 40c, 40d and generates a three-dimensional terrain map of the surface which may be used to identify a suitable landing site and to orient aircraft 10 relative to the selected landing site. Even though the altitude sensors of altitude sensor array 40 have been described as being disposed within the landing feet of landing gear assembly 38, it should be understood by those having ordinary skill in the art that altitude sensors could additionally or alternatively be coupled to or embedded within lower surfaces of cargo pod 22, wings 14, 16 and/or pylons 18, 20 such that when aircraft 10 is in the VTOL orientation, altitude sensor array 40 is configured to obtain multifocal altitude data relative to the surface below aircraft 10.

Figure 2A:
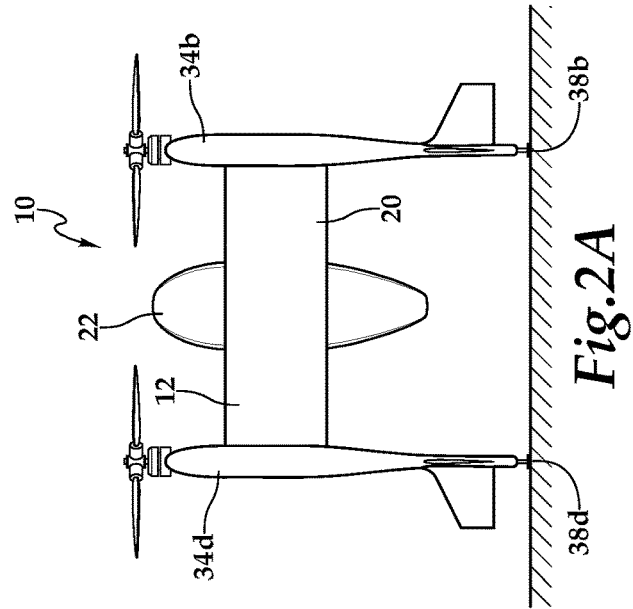

Referring additionally to FIGS. 2A-2I in the drawings, a sequential flight-operating scenario of aircraft 10 is depicted. As best seen in FIG. 2A, aircraft 10 is in a tailsitter position on a surface such as the ground, a helipad or the deck of an aircraft carrier with landing feet 38a, 38b, 38c, 38d in contact with the surface. When aircraft 10 is ready for a mission, flight control system 30 commences operations providing flight commands to the various components of aircraft 10. Flight control system 30 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight.

Figure 2B:
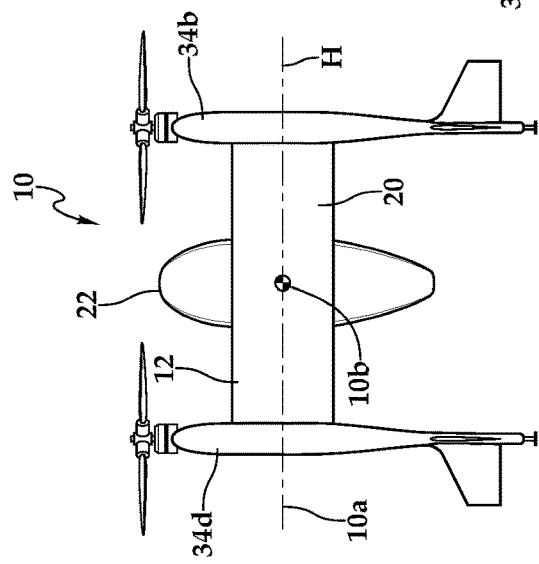

As best seen in FIG. 2B, aircraft 10 has performed a vertical takeoff and is engaged in thrust-borne lift in the VTOL orientation of aircraft 10. As illustrated, the rotor assemblies of propulsion assemblies 34 are each rotating in substantially the same horizontal plane. As longitudinal axis 10a and lateral axis 10b (denoted as the target) are both in a horizontal plane H that is normal to the local vertical in the earth's reference frame, aircraft 10 has a level flight attitude. In the VTOL orientation, wing 16 is the forward wing and wing 14 is the aft wing. As discussed herein, flight control system 30 independently controls and operates each propulsion assembly 34 including independently controlling speed and thrust vector. During hover, flight control system 30 may utilize differential speed control and/or differential or collective thrust vectoring of propulsion assemblies 34 to provide hover stability for aircraft 10 and to provide pitch, roll, yaw and translation authority for aircraft 10.

Figure 2C:
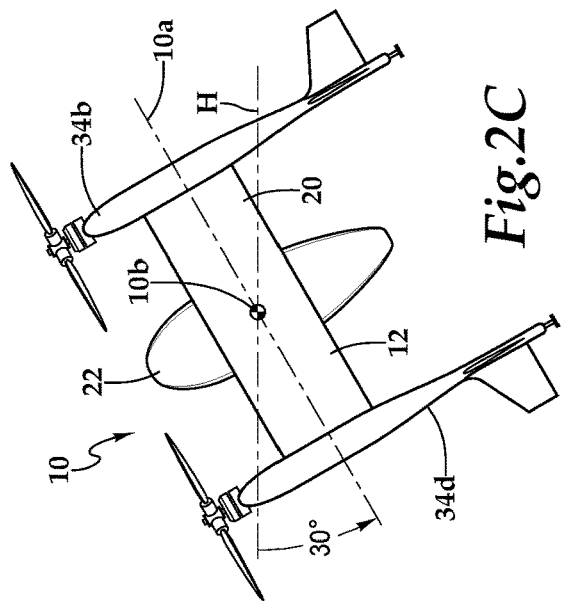
Figure 2D:
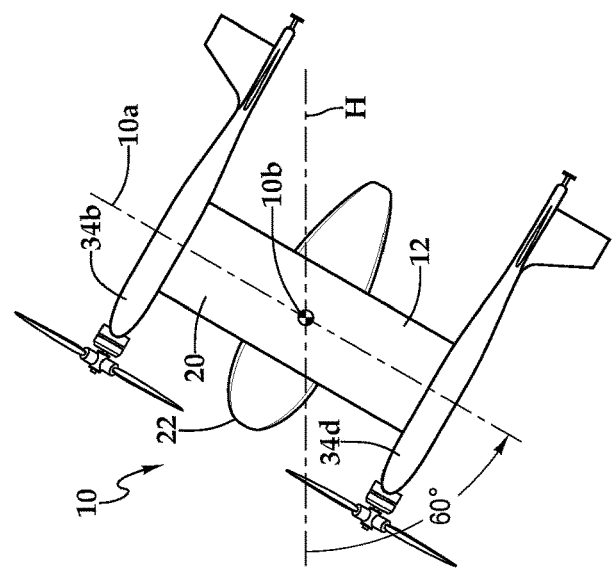

After vertical ascent to the desired elevation, aircraft 10 may begin the transition from thrust-borne lift to wing-borne lift. As best seen from the progression of FIGS. 2B-2E, aircraft 10 is operable to pitch down from the VTOL orientation toward the biplane orientation to enable high speed and/or long range forward flight. As seen in FIG. 2C, longitudinal axis 10a extends out of the horizontal plane H such that aircraft 10 has an inclined flight attitude of about thirty degrees pitch down. As seen in FIG. 2D, longitudinal axis 10a extends out of the horizontal plane H such that aircraft 10 has an inclined flight attitude of about sixty degrees pitch down. Flight control system 30 may achieve this operation through speed control of some or all of propulsion assemblies 34, thrust vectoring of some or all of propulsion assemblies 34 or any combination thereof.

Figure 2E:
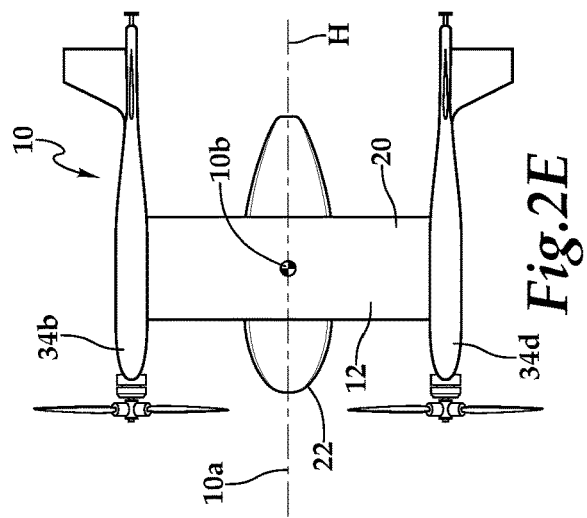

As best seen in FIG. 2E, aircraft 10 has completed the transition to the biplane orientation with the rotor assemblies of propulsion assemblies 34 each rotating in substantially the same vertical plane. In the biplane orientation, wing 14 is the upper wing positioned above wing 16, which is the lower wing. By convention, longitudinal axis 10a has been reset to be in the horizontal plane H, which also includes lateral axis 10b, such that aircraft 10 has a level flight attitude in the biplane orientation. As forward flight with wing-borne lift requires significantly less power than VTOL flight with thrust-borne lift, the operating speed of some or all of the propulsion assemblies 34 may be reduced. In certain embodiments, some of the propulsion assemblies of aircraft 10 could be shut down during forward flight. In the biplane orientation, the independent control provided by flight control system 30 over each propulsion assembly 34 provides pitch, roll and yaw authority for aircraft 10.

Figure 2F:
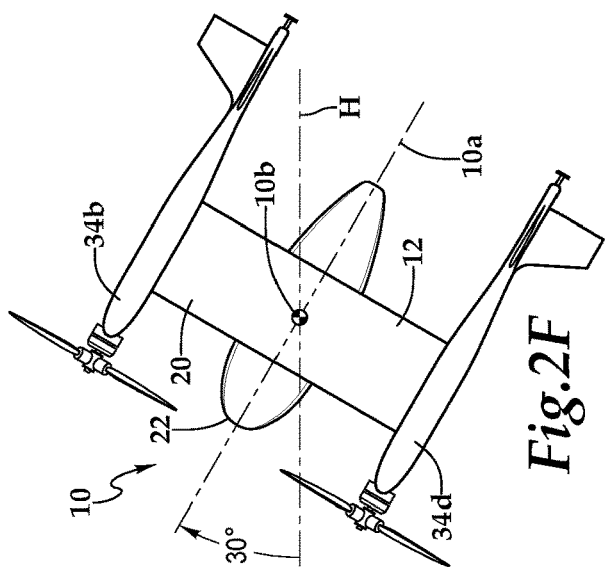

As aircraft 10 approaches the desired location, aircraft 10 may begin its transition from wing-borne lift to thrust-borne lift. As best seen from the progression of FIGS. 2E-2H, aircraft 10 is operable to pitch up from the biplane orientation to the VTOL orientation to enable, for example, a vertical landing operation. As seen in FIG. 2F, longitudinal axis 10a extends out of the horizontal plane H such that aircraft 10 has an inclined flight attitude of about thirty degrees pitch up. As seen in FIG. 2G, longitudinal axis 10a extends out of the horizontal plane H such that aircraft 10 has an inclined flight attitude of about sixty degrees pitch up. Flight control system 30 may achieve this operation through speed control of some or all of propulsion assemblies 34, thrust vectoring of some or all of propulsion assemblies 34 or any combination thereof. In FIG. 2H, aircraft 10 has completed the transition from the biplane orientation to the VTOL orientation and, by convention, longitudinal axis 10a has been reset to be in the horizontal plane H which also includes lateral axis 10b such that aircraft 10 has a level flight attitude in the VTOL orientation.

Once aircraft 10 has completed the transition to the VTOL orientation, aircraft 10 may hover and commence its vertical descent to a landing site. As illustrated, FIG. 2H may represent aircraft 10 utilizing altitude sensor array 40 disposed within landing feet 38a, 38b, 38c, 38d to obtain multifocal altitude data relative to a potential landing area. Altitude sensors 40a, 40b, 40c, 40d may be radar altimeters, laser altimeters, acoustic altimeters, optical sensors or other suitable terrain mapping sensors. In the illustrated embodiment, altitude sensor array 40 is deploying radar altimeters 40a, 40b, 40c, 40d that are respectively configured to transmit and receive radio waves 42a, 42b, 42c, 42d that travel to the surface and are reflected back. The difference in time, phase and/or frequency between the transmitted and received signals is used to determine the absolute altitude of each radar altimeter 40a, 40b, 40c, 40d above the surface. Radar altimeters 40a, 40b, 40c, 40d may use pulsed modulation, linear frequency modulation or other suitable modulation technique and may operate between 4200-4400 MHz or other suitable frequency. When radar altimeters 40a, 40b, 40c, 40d operate with continuous waves such as frequency modulate continuous waves, each radar altimeter 40a, 40b, 40c, 40d should operate with a suitable frequency offset (5-10 MHz) to avoid interference between the radar altimeters of altitude sensor array 40. Alternatively, the signals from radar altimeters 40a, 40b, 40c, 40d may be sequenced such that only one of radar altimeters 40a, 40b, 40c, 40d is signaling at a given time. Each radar altimeter 40a, 40b, 40c, 40d may generate a single altitude reading or a point cloud of altitude data. In either case, due to the location of radar altimeters 40a, 40b, 40c, 40d within landing feet 38a, 38b, 38c, 38d and the distances therebetween, altitude sensor array 40 is configured to obtain multifocal altitude data relative to the potential landing area that is combined and processed by flight control computer 30 to generate a three-dimensional terrain map.

This process may occur when aircraft 10 is between twenty and several hundred feet above the ground or other suitable height such that flight control computer 30 can evaluate a relatively large potential landing area to determine the location of an obstructions or other dangers. Once flight control computer 30 has identified a suitable landing site within the potential landing area, aircraft 10 may descend to between ten and fifty feet above the ground or other suitable height, such as near but above the landing decision point, and utilize altitude sensor array 40 again to make a finer evaluation of the selected landing site. In this evaluation, flight control computer 30 may determine, for example, whether the selected landing site has a slope that would impact the landing stability and/or tip-over stability of aircraft 10. FIG. 2H may also represent this phase of the landing process. In the illustrated embodiment, flight control computer 30 has determined, based upon the multifocal altitude data obtained from altitude sensors 40a, 40b, 40c, 40d and the refined three-dimensional terrain map generated therefrom, that the slope of the surface will not impact the landing stability and/or tip-over stability of aircraft 10. As best seen in FIG. 2I, aircraft 10 has completed its descent and has made a four point landing in which each of landing feet 38a, 38b, 38c, 38d contacts the surface at substantially the same time. Aircraft 10 now rests in its tailsitter orientation at the selected landing site.

Figure 3A:
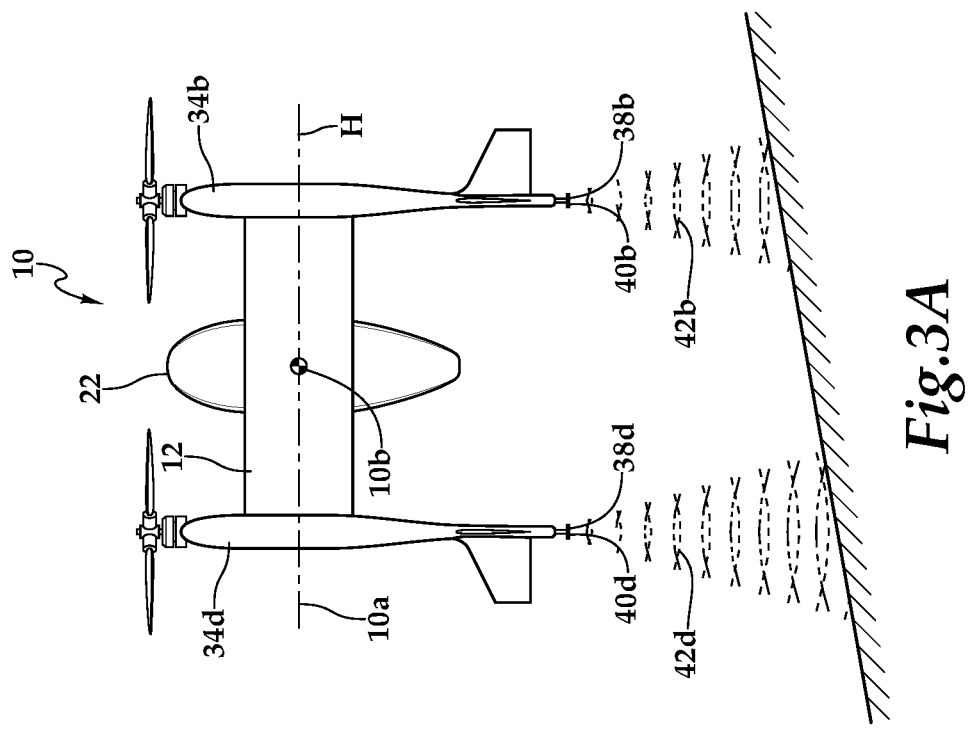
FIGS. 3A-3F are schematic illustrations of an aircraft having multifocal landing sensors in various landing scenarios in accordance with embodiments of the present disclosure.
Figure 3B:
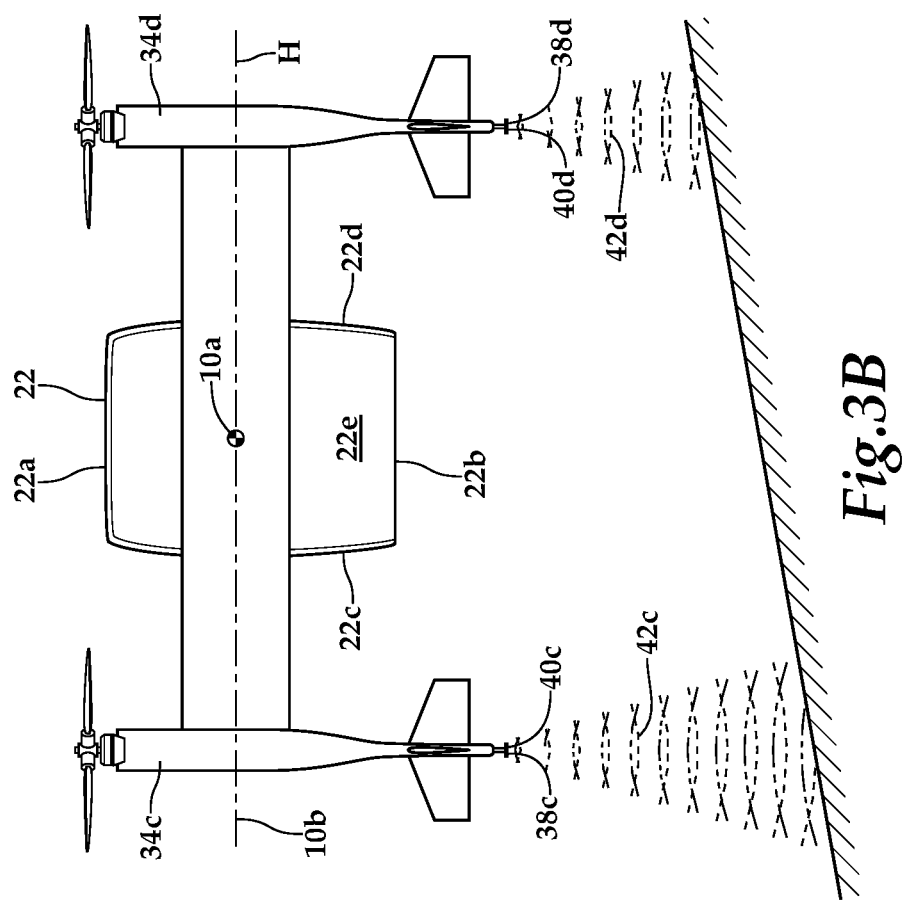

Referring now to FIGS. 3A-3F in the drawings, additional landing scenarios for aircraft 10 are depicted. FIG. 3A represents aircraft 10 after identifying a landing site, similar to aircraft 10 in FIG. 2H. In this case, however, when aircraft 10 utilizes altitude sensor array 40 to make the finer evaluation of the selected landing site, flight control computer 30 determines that the slope of the surface may impact the landing stability and/or tip-over stability of aircraft 10, based upon the multifocal altitude data obtained from altitude sensors 40a, 40b, 40c, 40d and the refined three-dimensional terrain map generated therefrom. Based upon the detected slope of the surface, flight control computer 30 determines that the orientation of aircraft 10 should be changed prior to landing on the surface to improve the landing stability and/or tip-over stability of aircraft 10. In this case, the slope of the surface was originally aligned with longitudinal axis 10a, as best seen in FIG. 3A, which relates to the width of aircraft 10. As the width of aircraft 10 is less than the length of aircraft 10, the landing base of aircraft 10 relative to the slope of the surface is greater when the slope of the surface is aligned with lateral axis 10b rather than longitudinal axis 10a. Accordingly, flight control computer 30 commands propulsion assemblies 34 to rotate aircraft 10 approximately ninety degrees such that the slope of the surface is aligned with lateral axis 10b, which relates to the length of aircraft 10, as best seen in FIG. 3B. In this manner, flight control computer 30 is configured to orient aircraft 10 in a preferred landing orientation relative to a surface, such as a sloped surface, to provide greater landing stability and/or tip-over stability for aircraft 10.

Figure 3C:
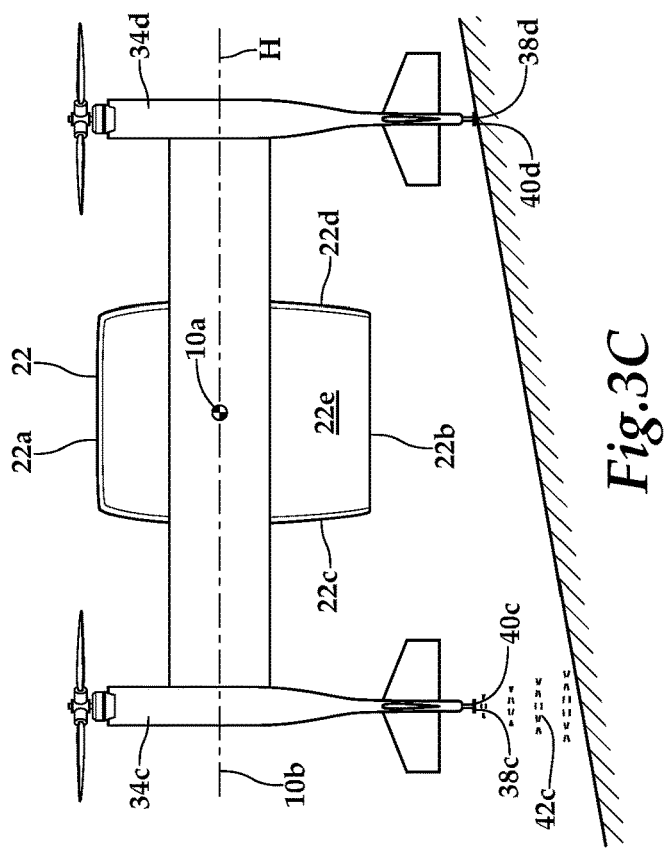
Figure 3D:
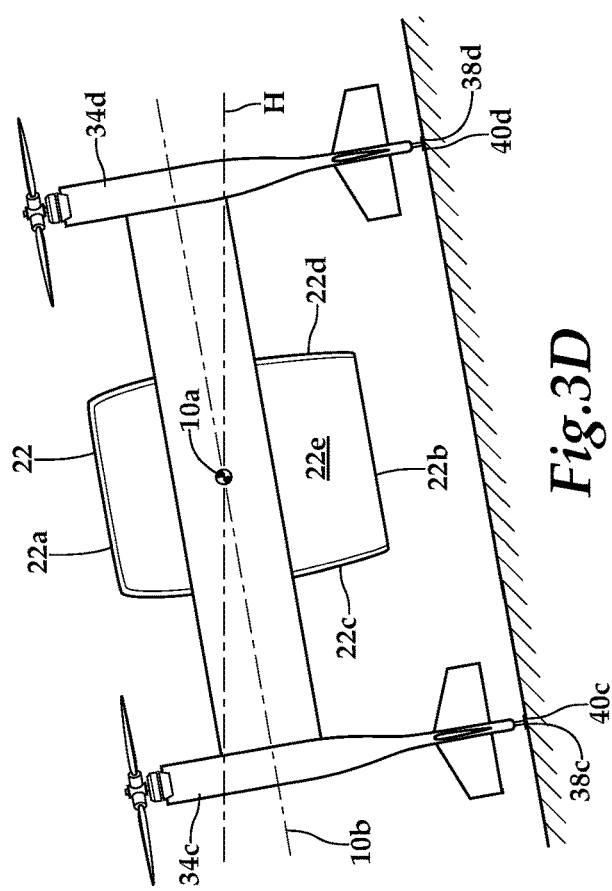

Once aircraft 10 is in a preferred landing orientation relative to the surface of the selected landing site, aircraft 10 may commence its final descent to the surface. For example, as best seen from the progression of FIGS. 3B-3D, aircraft 10 starts its final descent with a level flight attitude as seen in FIG. 3B while continuing to use altitude sensors 40a, 40b, 40c, 40d and the absolute altitude information calculated therefrom. As aircraft 10 approaches and eventually contacts the surface with landing feet 38b, 38d, as best seen in FIG. 3C, altitude sensors 40b, 40d provide an indication that landing feet 38b, 38d are in contact with the surface while altitude sensors 40a, 40c provide an indication that landing feet 38a, 38c are not in contact with the surface. Aircraft 10 now lowers its right side until landing feet 38a, 38c contact the surface, as best seen in FIG. 3D, with altitude sensors 40a, 40b, 40c, 40d respectively providing an indication that landing feet 38a, 38b, 38c, 38d are in contact with the surface. In this manner, flight control computer 30 is configured to land aircraft 10 on a sloped landing site making a two point by two point landing wherein altitude sensors 40a, 40b, 40c, 40d effectively operate as weight on gear (WOG) sensors, respectively indicating when landing feet 38a, 38b, 38c, 38d are in contact with the surface. In addition, as lateral axis 10b is aligned with the slope of the surface, aircraft 10 is in a preferred landing orientation relative to the surface with maximum landing stability and/or tip-over stability.

Figure 3E:
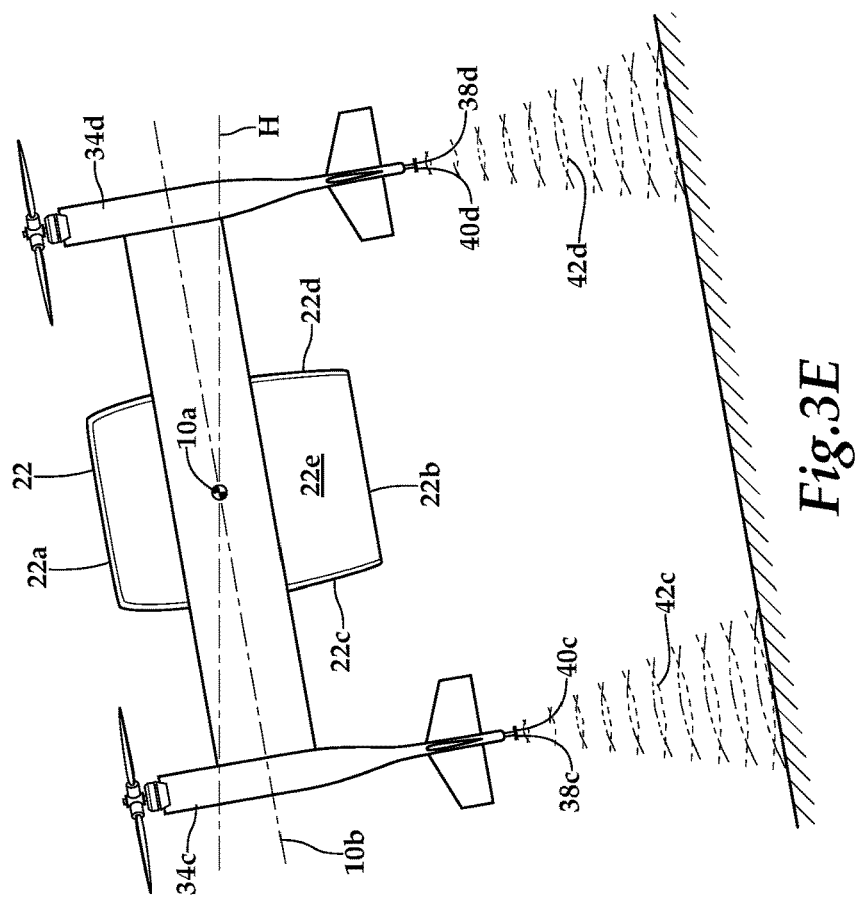
Figure 3F:
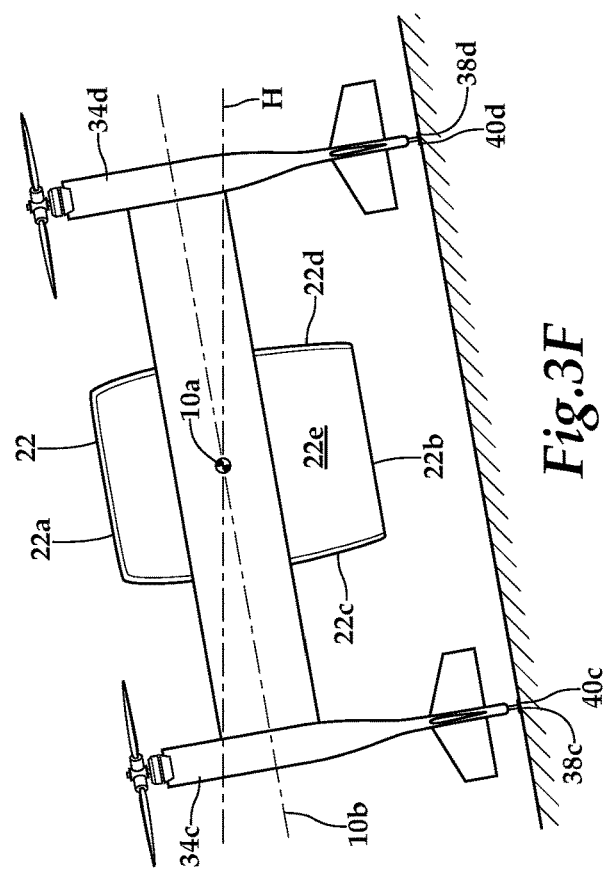

Another example of aircraft 10 landing in a preferred landing orientation relative to a sloped surface is depicted in the progression of FIGS. 3B and 3E-3F. Aircraft 10 starts its final descent with a level flight attitude, as seen in FIG. 3B, while continuing to use altitude sensors 40a, 40b, 40c, 40d and the absolute altitude information calculated therefrom. In this case, aircraft 10 performs a roll right maneuver until lateral axis 10b is substantially parallel with the slope of the surface, as best seen in FIG. 3E. Aircraft 10 continues its descent until landing feet 38a, 38b, 38c, 38d contact the surface, as best seen in FIG. 3F, with altitude sensors 40a, 40b, 40c, 40d each providing an indication that respective landing feet 38a, 38b, 38c, 38d are in contact with the surface. In this manner, flight control computer 30 is configured to land aircraft 10 on a sloped landing site making a four point landing wherein altitude sensors 40a, 40b, 40c, 40d effectively operate as weight on gear sensors respectively indicating when landing feet 38a, 38b, 38c, 38d are in contact with the surface. In addition, as lateral axis 10b is aligned with the slope of the surface, aircraft 10 is in a preferred landing orientation relative to the surface with maximum landing stability and/or tip-over stability.

Figure 4:
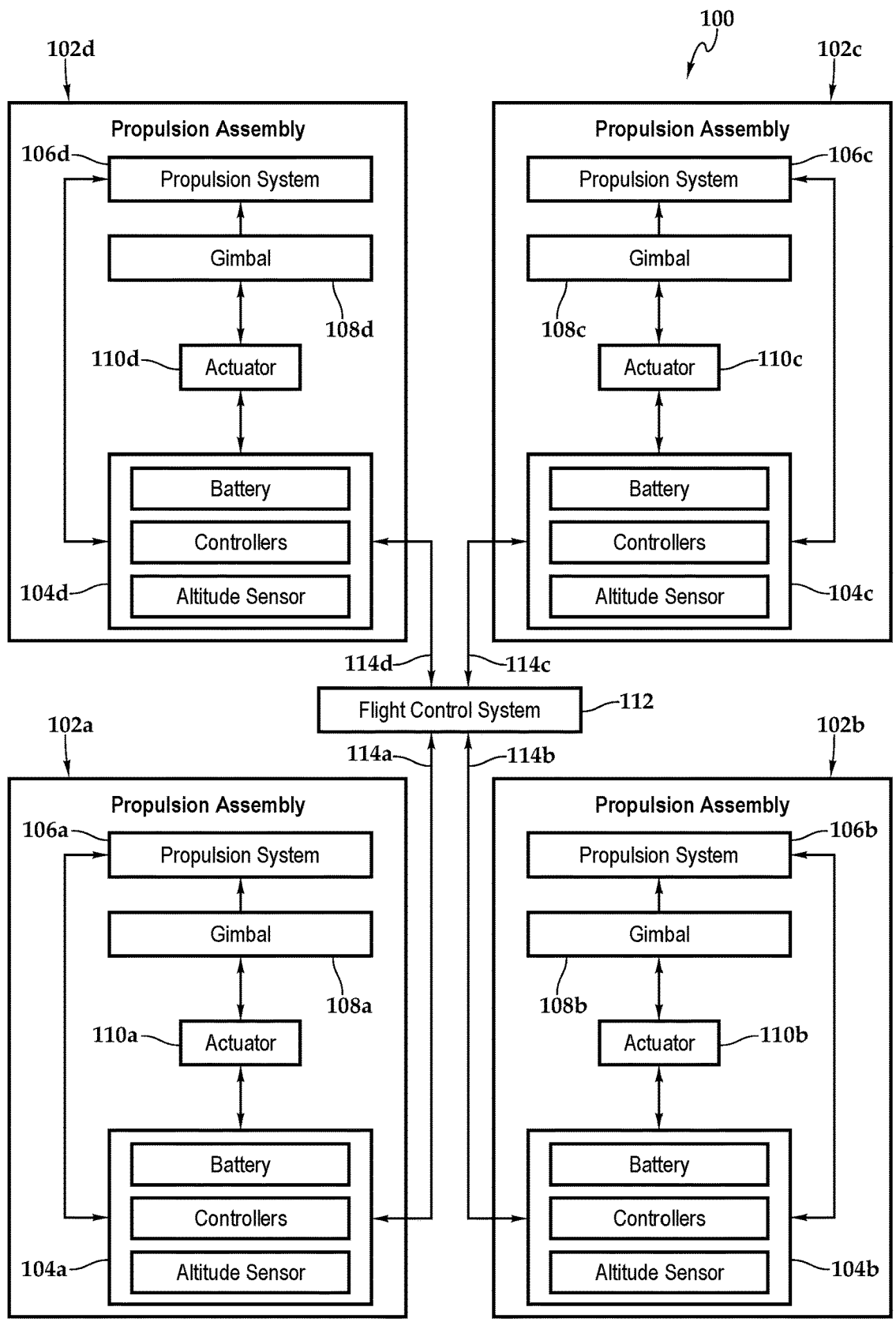
FIG. 4 is a block diagram of one implementation of a plurality of propulsion assemblies and a flight control system for an aircraft having multifocal landing sensors in accordance with embodiments of the present disclosure.

Referring next to FIG. 4, a block diagram illustrates one implementation of a propulsion and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes various electronic component 104a including one or more batteries, one or more controllers and one or more sensors including an altitude sensor. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including one or more batteries, one or more controllers and one or more sensors including an altitude sensor. Propulsion assembly 102b also includes a propulsion system 106b and a two-axis gimbal 108b operated by one or more actuators 110b. Propulsion assembly 102c includes an electronics node 104c depicted as including one or more batteries, one or more controllers and one or more sensors including an altitude sensor. Propulsion assembly 102c also includes a propulsion system 106c and a two-axis gimbal 108c operated by one or more actuators 110c. Propulsion assembly 102d includes an electronics node 104d depicted as including one or more batteries, one or more controllers and one or more sensors including an altitude sensor. Propulsion assembly 102d also includes a propulsion system 106d and a two-axis gimbal 108d operated by one or more actuators 110d. A flight control system 112 is operably associated with each of propulsion assemblies 102a, 102b, 102c, 102d and is linked to the electronic nodes 104a, 104b, 104c, 104d by a fly-by-wire communications network depicted as arrows 114a, 114b, 114c, 114d. Flight control system 112 receives sensor data from and sends commands to propulsion assemblies 102a, 102b, 102c, 102d to enable flight control system 112 to independently control each of propulsion assemblies 102a, 102b, 102c, 102d, as discussed herein.

Figure 5:
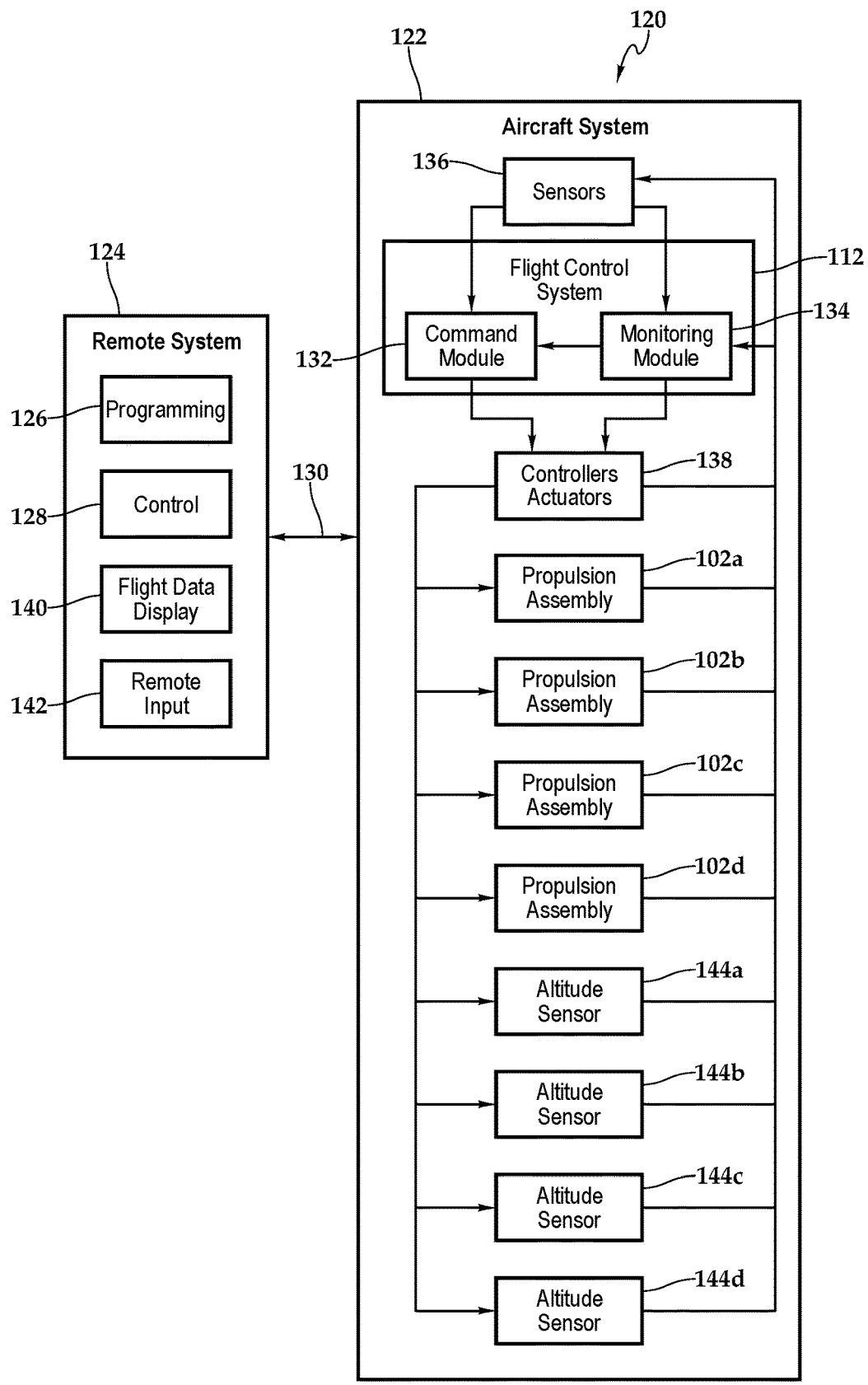
FIG. 5 is a block diagram of autonomous and remote control systems for an aircraft having multifocal landing sensors in accordance with embodiments of the present disclosure.

Referring additionally to FIG. 5 in the drawings, a block diagram depicts a control system 120 operable for use with aircraft 100 or aircraft 10 of the present disclosure. In the illustrated embodiment, system 120 includes two primary computer based subsystems; namely, an aircraft system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide a flight plan including, for example, a starting point, a trail of waypoints and an ending point such that flight control system 112 may use waypoint navigation during the mission. In addition, programming application 126 may provide one or more tasks to flight control system 112 for aircraft 100 to accomplish during the mission such as delivery of payload 24 to a desired location. Following programming, aircraft 100 may operate autonomously responsive to commands generated by flight control system 112.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers/actuators 138, propulsion assemblies 102a, 102b, 102c, 102d and altitude sensors 144a, 144b, 144c, 144d as well as external sources such as remote system 124, global positioning system satellites or other location positioning systems and the like.

During the various operating modes of aircraft 100 such as the vertical takeoff flight mode, the hover flight mode, the forward flight mode, transition flight modes and the vertical landing flight mode, command module 132 provides commands to controllers/actuators 138. These commands enable independent operation of propulsion assembly 102a, 102b, 102c, 102d including rotor speed, thrust vector and the like as well as independent or collective operation altitude sensors 144a, 144b, 144c, 144d. Flight control system 112 receives feedback from controllers/actuators 138, propulsion assembly 102a, 102b, 102c, 102d and altitude sensors 144a, 144b, 144c, 144d. This feedback is processes by monitoring module 134 that can supply correction data and other information to command module 132 and to controllers/actuators 138. Sensors 136, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 112 to further enhance autonomous control capabilities. Prior to landing, flight control system 112 receives multifocal altitude data from altitude sensors 144a, 144b, 144c, 144d and may generate one or more three-dimensional terrain maps of the surface which may be used to identify a suitable landing site, to orient the aircraft relative to the selected landing site and to land the aircraft, as discussed herein.

Some or all of the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

Figure 6B:
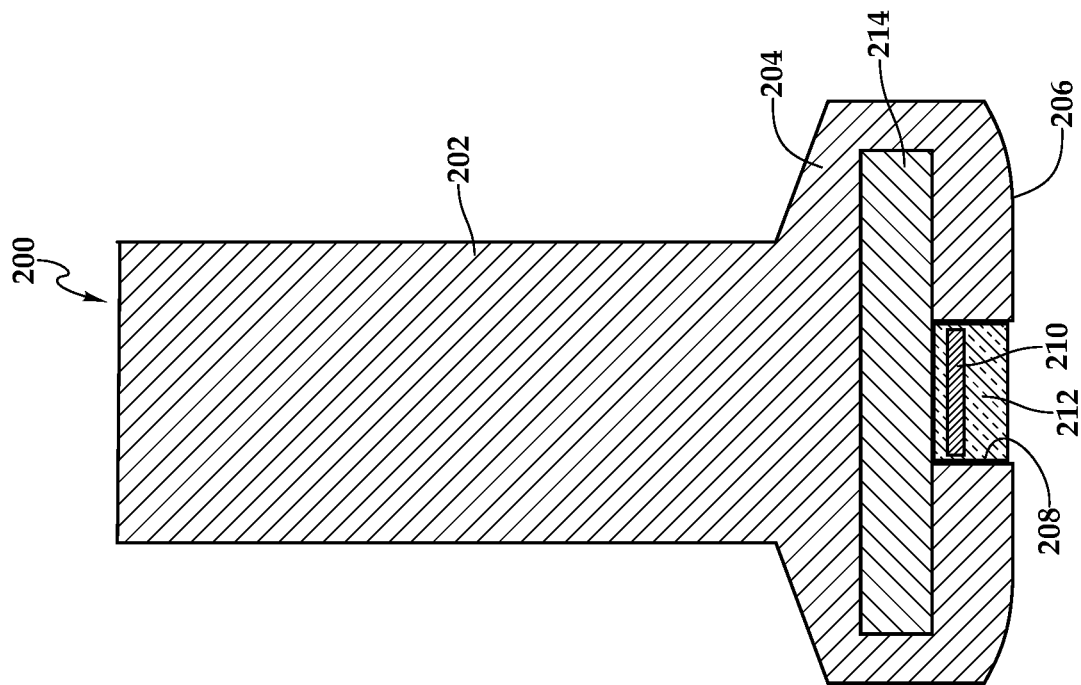
FIGS. 6A-6B are schematic illustrations of a landing foot for use on an aircraft having multifocal landing sensors in accordance with embodiments of the present disclosure.
Figure 6A:
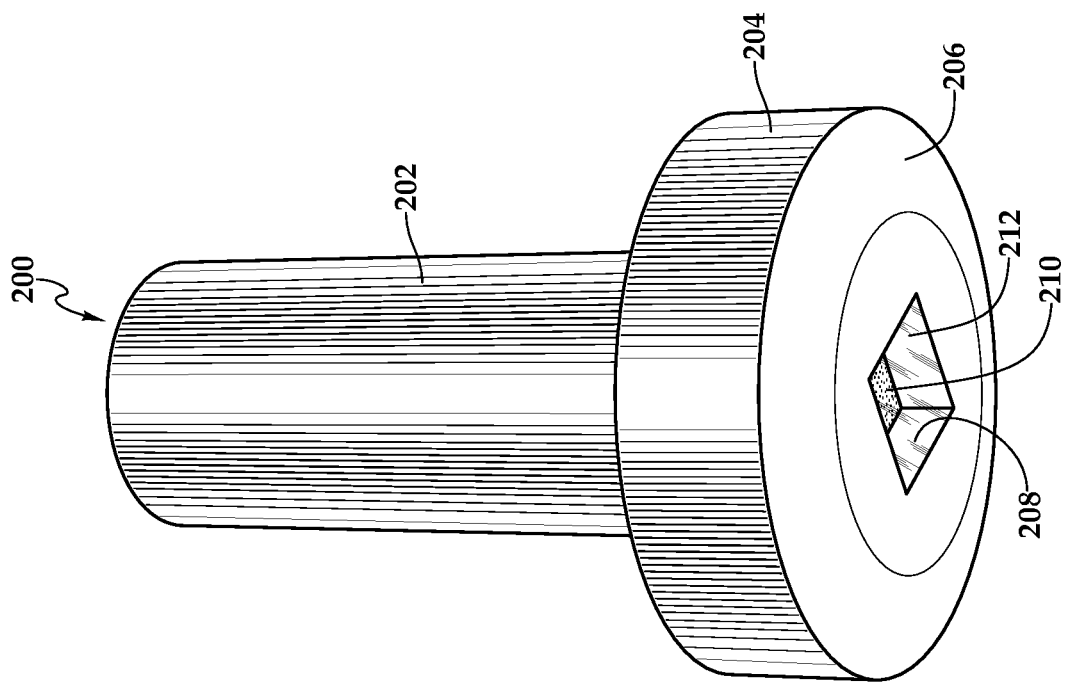

Referring next to FIGS. 6A-6B, an embodiment of a landing foot 200 that is representative of landing feet 38a, 38b, 38c, 38d discussed herein will now be described. Landing foot 200 include a cylindrical support 202 the upper portion of which would be mechanically and electrically coupled to a lower end of one of the propulsion assemblies 34. Landing foot 200 also include a generally cylindrical base 204 having a lower surface 206 that is configured for contact with the surface when aircraft 10 is in its tailsitter position. In the illustrated embodiment, landing foot 200 includes a cavity 208 extending upward from lower surface 206 and proximate the center of base 204. An altitude sensor 210 is disposed within cavity 208 and is preferably supported therein with a radio frequency transparent material 212 such as epoxy or resin which protects altitude sensor 210 from environmental conditions and impacts. In the illustrated embodiment, landing foot 200 also includes an interior volume that houses electronic components 214 for controlling altitude sensor 210, processing data collected by altitude sensor 210 and/or communicating with flight control system 30.

Figure 7:
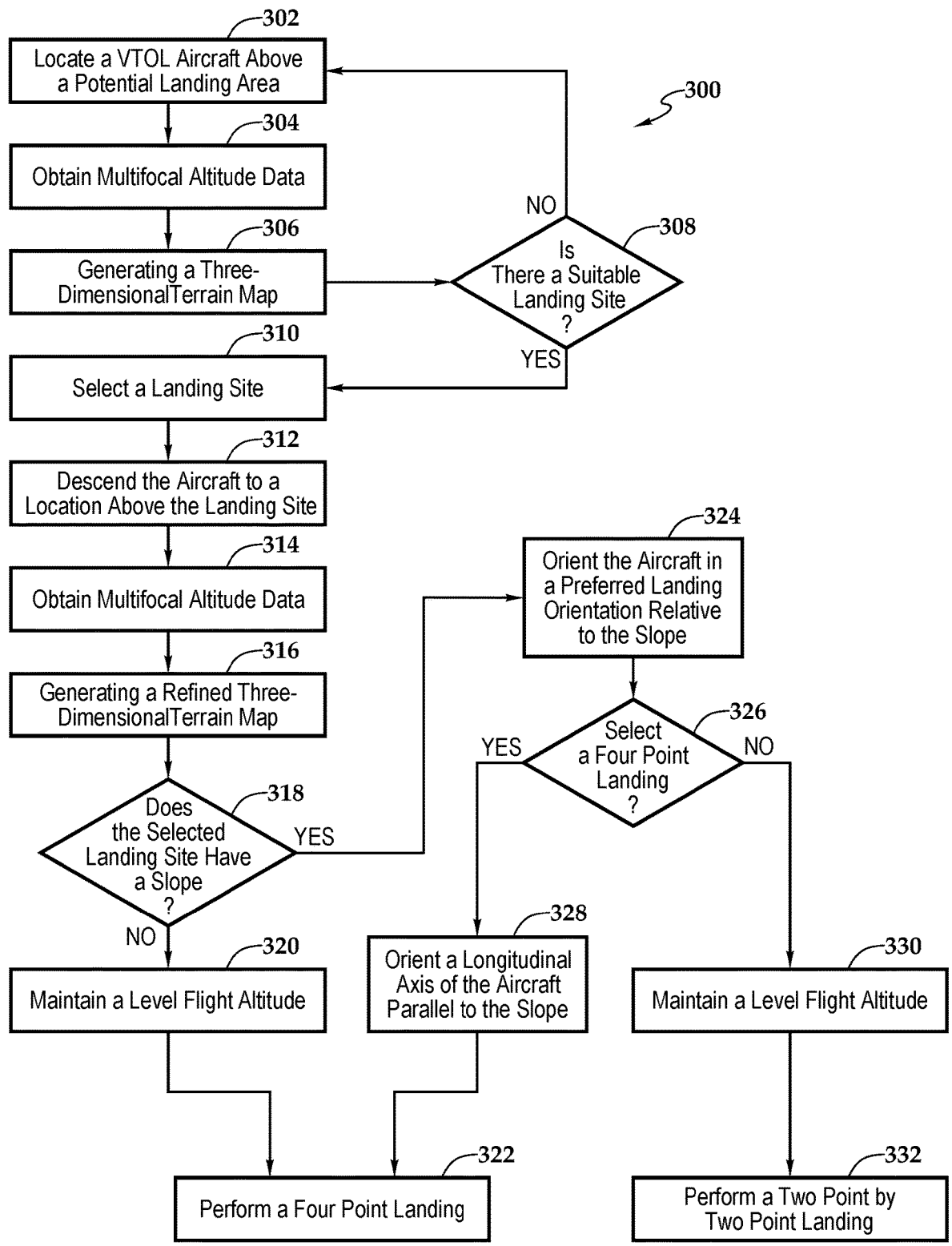
FIG. 7 is a flow diagram for a method of operating an aircraft having multifocal landing sensors in accordance with embodiments of the present disclosure.

Referring next to FIG. 7, a flow diagram depicts a method 300 of operating an aircraft having multifocal landing sensors. In step 302, an aircraft having VTOL capabilities hovers or is otherwise located above a potential landing area. The aircraft preferably has a suitable altitude such that a relatively large potential landing area can be evaluated. The flight control system of the aircraft now commands an altitude sensor array, such as a plurality of radar altimeter altitude sensor embedded in the landing feet of the aircraft, to obtain multifocal altitude data relative to the potential landing area in step 304. The flight control system combines the multifocal altitude data to generate a three-dimensional terrain map of the potential landing area in step 306. Based upon the three-dimensional terrain map, the flight control system determines whether there is a suitable landing site within the potential landing area at decision 308. If the flight control system determines there is not a suitable landing site within the potential landing area, the process returns to step 302 such that a new potential landing area can be evaluated. If the flight control system determines there is a suitable landing site within the potential landing area, the flight control system selects a landing site in step 310.

Once the landing site is selected, the aircraft descends to a location above the selected landing site in step 312. The flight control system now commands the altitude sensor array to obtain multifocal altitude data relative to the selected landing site in step 314. The flight control system combines the multifocal altitude data to generate a refined three-dimensional terrain map of the selected landing site in step 316. Based upon the three-dimensional terrain map, the flight control system determines whether the landing site has a slope that could impact the landing stability and/or tip-over stability of the aircraft at decision 318. If the flight control system determines the slope of the landing site will not impact the landing stability and/or tip-over stability of the aircraft, the aircraft maintains a level flight attitude in step 320 and makes a four point landing at the landing site in step 322. If the flight control system determines the slope of the landing site could impact the landing stability and/or tip-over stability of the aircraft, the flight control system commands the propulsion assemblies to orient the aircraft in a preferred landing orientation relative to the slope in step 324 such as by orienting the lateral axis of the aircraft to be aligned with the slope.

Once the aircraft is in a preferred landing orientation relative to the slope, the flight control system determines whether to perform a four point landing at decision 326. If the flight control system determines that the aircraft should perform a four point landing, the flight control system commands the propulsion assemblies to roll the aircraft to orient the lateral axis of the aircraft to be substantially parallel with the slope in step 328 then makes a four point landing at the landing site in step 322. If the flight control system determines that the aircraft should not perform a four point landing, the aircraft maintains a level flight attitude in step 330 and makes a two point by two point landing at the landing site in step 332.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having a VTOL orientation, the aircraft comprising:
   an airframe;
   a thrust array attached to the airframe, the thrust array including a plurality of propulsion assemblies;
   a flight control system coupled to the airframe and operable to independently control each of the propulsion assemblies;
   a landing gear assembly coupled to the airframe, the landing gear assembly including a plurality of landing feet; and
   an altitude sensor array including a plurality of altitude sensors each disposed within one of the landing feet such that when the aircraft is in the VTOL orientation, the altitude sensor array is configured to obtain multifocal altitude data relative to a surface;
   wherein, the flight control system is configured to generate a three-dimensional terrain map of the surface based upon the multifocal altitude data; and
   wherein, the flight control system is configured to autonomously orient the aircraft in a preferred landing orientation relative to the surface based upon the three-dimensional terrain map.

2. The aircraft as recited in claim 1 wherein the altitude sensors further comprise radar altimeters configured to reflect radio waves off the surface.

3. The aircraft as recited in claim 1 wherein the altitude sensor array includes at least three altitude sensors.

4. The aircraft as recited in claim 1 wherein the altitude sensor array includes four altitude sensors.

5. The aircraft as recited in claim 1 wherein each of the altitude sensors is disposed proximate a distal end of the respective one of the landing feet.

6. The aircraft as recited in claim 1 wherein the flight control system is configured to determine whether one or more of the landing feet are in contact with the surface based upon the multifocal altitude data.

7. The aircraft as recited in claim 1 wherein the flight control system is configured to identify a suitable landing site based upon the three-dimensional terrain map.

8. The aircraft as recited in claim 1 wherein the flight control system is configured to autonomously orient the aircraft in a preferred landing orientation relative to a slope of the surface based upon the three-dimensional terrain map.

9. The aircraft as recited in claim 1 wherein the flight control system is configured to autonomously orient a lateral axis of the aircraft to be substantially parallel to a slope of the surface prior to the aircraft making a four point landing on the surface.

10. The aircraft as recited in claim 1 wherein the flight control system is configured to autonomously maintain a level flight attitude prior to the aircraft making a two point by two point landing on a portion of the surface having a slope.

11. The aircraft as recited in claim 1 wherein the airframe further comprises first and second wings with first and second pylons extending therebetween;
   wherein the thrust array further comprises a two-dimensional distributed thrust array; and
   wherein the plurality of propulsion assemblies includes at least two propulsion assemblies coupled to the first wing and at least two propulsion assemblies coupled to the second wing.

12. The aircraft as recited in claim 1 wherein the propulsion assemblies further comprise thrust vectoring propulsion assemblies.

13. A method of operating an aircraft, the method comprising:
   locating the aircraft in a VTOL orientation over a surface, the aircraft including an airframe, a plurality of propulsion assemblies coupled to the airframe, a landing gear assembly coupled to the airframe and including a plurality of landing feet each having an altitude sensor disposed therein and a flight control system in communication with the altitude sensors and operable to control the propulsion assemblies;
   obtaining multifocal altitude data from the altitude sensors;
   generating a three-dimensional terrain map of the surface with the flight control system based upon the multifocal altitude data; and
   autonomously orienting the aircraft in a preferred landing orientation relative to the surface based upon the three-dimensional terrain map.

14. The method as recited in claim 13 further comprising identifying a suitable landing site based upon the three-dimensional terrain map.

15. The method as recited in claim 13 further comprising autonomously orienting the aircraft in a preferred landing orientation relative to a slope of the surface based upon the three-dimensional terrain map.

16. The method as recited in claim 13 further comprising autonomously orienting a lateral axis of the aircraft to be substantially parallel to a slope of the surface prior to making a four point landing on the surface.

17. The method as recited in claim 13 further comprising autonomously maintaining a substantially level flight attitude prior to making a two point by two point landing on a portion of the surface having a slope.

18. The method as recited in claim 13 further comprising determining whether one or more of the landing feet are in contact with the surface based upon the multifocal altitude data.

* * * * *